(12) United States Patent
Maas, Jr. et al.

(10) Patent No.: US 12,546,368 B2
(45) Date of Patent: Feb. 10, 2026

(54) BEARING ASSEMBLY

(71) Applicant: Tyco Fire Products LP, Cranston, RI (US)

(72) Inventors: Karl Maas, Jr., Peshtigo, WI (US); Adam Staszak, Marinette, WI (US)

(73) Assignee: Tyco Fire Products LP, Cranston, RI (US)

(*) Notice: Subject to any disclaimer, the term of this patent is extended or adjusted under 35 U.S.C. 154(b) by 175 days.

(21) Appl. No.: 18/545,211

(22) Filed: Dec. 19, 2023

(65) Prior Publication Data

US 2024/0117843 A1    Apr. 11, 2024

Related U.S. Application Data

(63) Continuation of application No. 17/772,100, filed as application No. PCT/IB2020/060106 on Oct. 28, 2020, now Pat. No. 11,859,669.

(Continued)

(51) Int. Cl.
*F16C 19/06*     (2006.01)
*A62C 31/02*     (2006.01)
(Continued)

(52) U.S. Cl.
CPC ............ *F16C 35/045* (2013.01); *A62C 31/02* (2013.01); *A62C 31/28* (2013.01); *F16C 19/06* (2013.01); *F16C 33/586* (2013.01); *F16C 35/063* (2013.01)

(58) Field of Classification Search
CPC ...... F16C 19/06; F16C 33/586; F16C 35/045; F16C 35/063; F16C 43/04; F16C 2361/41;

(Continued)

(56) References Cited

U.S. PATENT DOCUMENTS 2,612,402 A    9/1952  Miscovich
2,998,199 A    8/1961  Miscovich
(Continued)

FOREIGN PATENT DOCUMENTS

AU         689653 B2 *  4/1998  .............. F16L 37/23
CN     104110544 A     10/2014
(Continued)

OTHER PUBLICATIONS

Automatic Water Oscillating Monitor WOM-3 Data Sheet, Tyco Fire Protection Products, 2016, 1-2.

(Continued)

*Primary Examiner* — Phillip A Johnson
(74) *Attorney, Agent, or Firm* — Foley & Lardner LLP

(57) ABSTRACT

A rotational coupling including a bearing assembly including a first race rotatably coupled to a second race, wherein the first race is configured to receive a plurality of first fasteners to couple the first race and the bearing assembly to a fluid supply. The rotational coupling also including a connection flange coupled to the second race and configured to receive a plurality of second fasteners to couple the connection flange to the second race. The second race includes a first side facing the connection flange and a second side opposite the first side and facing the first race, wherein the second race includes at least one access aperture configured to enable access to the plurality of first fasteners from the first side to removably couple the bearing assembly to the fluid supply.

19 Claims, 7 Drawing Sheets

Related U.S. Application Data

(60) Provisional application No. 62/927,333, filed on Oct. 29, 2019.

(51) Int. Cl.
*A62C 31/28* (2006.01)
*F16C 33/58* (2006.01)
*F16C 35/04* (2006.01)
*F16C 35/063* (2006.01)

(58) Field of Classification Search
CPC ......... A62C 31/02; A62C 31/24; A62C 31/28; A62C 35/68; B05B 3/16; B05B 3/1035; B05B 5/0415; B05B 15/65; B05B 15/652; B05B 15/654; F16L 27/0824; F16L 27/0828; F16L 27/0832
See application file for complete search history.

(56) References Cited

U.S. PATENT DOCUMENTS

| | | | |
|---|---|---|---|
| 3,466,061 A | 9/1969 | Giusto | |
| 3,575,060 A * | 4/1971 | Warren | F16L 27/0828 239/587.2 |
| 5,486,053 A | 1/1996 | Beagley et al. | |
| 5,599,110 A | 2/1997 | MacKendrick | |
| 8,944,346 B2 | 2/2015 | Uhler | |
| 9,103,375 B2 | 8/2015 | Seufert et al. | |
| 9,188,162 B2 | 11/2015 | Kattenberg | |
| 9,383,051 B1 * | 7/2016 | Beck | B67D 1/00 |
| 2007/0086690 A1 | 4/2007 | Niebling et al. | |
| 2011/0162718 A1 | 7/2011 | Uhler | |
| 2015/0337895 A1 | 11/2015 | Bauck et al. | |

FOREIGN PATENT DOCUMENTS

| | | |
|---|---|---|
| CN | 105526452 A | 4/2016 |
| EP | 3 273 077 A1 | 1/2018 |
| JP | 3118508 U | 1/2006 |

OTHER PUBLICATIONS

CWPOM Water-Powered Oscillating Monitors Installation, Operation, and Maintenance Manual, Tyco Fire Protection Products, 2017, 1-17.

Style 3531 Oscillating Flange Installation, Operating and Maintenance Instructions, Akron Brass Company, 2010, 1-10.

U.S. Patent and Trademark Office as International Searching Authority; International Search Report and Written Opinion; PCT/IB2020/060106; dated May 19, 2021; 24 pages.

Water-Power Oscillating Monitor Style 916 Oscillating Flange, Protek Fire Fighting Equipment, 1 page.

Water-Power Oscillating Monitor Technical Specifications, Protek Fire Fighting Equipment, 1-2.

WPO-2000 Water Powered Monitor Oscillator Data Sheet, Elkhart Brass Mfg. Co., Inc., 2018, 1-2.

* cited by examiner

BEARING ASSEMBLY

CROSS-REFERENCE TO RELATED PATENT APPLICATIONS

This application is a continuation of U.S. application Ser. No. 17/772,100, filed Apr. 26, 2022, which is the U.S. national stage of International Application No. PCT/IB2020/060106, filed Oct. 28, 2020, which claims the benefit of U.S. Provisional Patent Application No. 62/927,333, filed Oct. 29, 2019, the entire disclosures of which are incorporated by reference herein in their entireties.

BACKGROUND

Fire suppression systems are commonly used to protect an area and/or objects within the area (e.g., an engine, a kitchen, a dock, a room, etc.) from a fire. Fire suppression systems may include nozzles to discharge a fire suppressant agent onto the area and objects. The nozzles can be coupled to oscillating monitors. An oscillating monitor oscillates a nozzle during activation of the fire suppression system to maximize the coverage of a spray of fire suppressant (e.g., water, agent, foam, etc.) from the nozzle.

SUMMARY

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

One embodiment of the present disclosure relates to a rotational coupling. The rotational coupling including a bearing assembly including a first race rotatably coupled to a second race, wherein the first race is configured to receive a plurality of first fasteners to couple the first race and the bearing assembly to a fluid supply conduit. The rotational coupling also including a connection flange coupled to the second race and including a plurality of second apertures configured to receive a plurality of second fasteners to couple the connection flange to the first race. The first race includes a first side facing the connection flange and a second side opposite the first side and facing the second race, wherein the first race includes at least one access aperture configured to enable access to the plurality of first fasteners from the first side to removably couple the bearing assembly to the fluid supply conduit.

Another embodiment relates to a discharge device. The discharge device including a nozzle, an oscillating monitor configured to oscillate the nozzle between a first angular position and a second angular position, and a rotational coupling rotatably coupling the oscillating monitor to the nozzle. The rotational coupling including a bearing assembly including a first race rotatably coupled to a second race, wherein the first race is configured to receive a plurality of first fasteners to couple the first race and the bearing assembly to a fluid supply conduit. The rotational coupling also includes a connection flange coupled to the second race and configured to receive a plurality of second fasteners to couple the connection flange to the second race. The second race includes a first side facing the connection flange and a second side opposite the first side and facing the first race, wherein the second race includes at least one access aperture configured to enable access to the plurality of first fasteners from the first side to removably couple the bearing assembly to the fluid supply conduit.

Another embodiment of the present disclosure relates to a rotational coupling. The rotational coupling including a body interfacing with a fluid supply conduit, a bearing assembly including a first race rotatably coupled to a second race, a rigid ring having a first side interfacing with the fluid supply conduit and a second side interfacing with a first side of the first race, a retention member received in a first groove of the fluid supply conduit wherein a first side of the retention member interfaces with a third side of the rigid ring, a connection flange having a first side interfacing with the fluid supply conduit, a second side of the connection flange interfacing with a second side of the retention member, the connection flange including a plurality of first apertures configured to receive a plurality of fasteners to couple the connection flange to a body, and wherein the bearing assembly is received between the body and the fluid supply conduit.

Another embodiment of the present disclosure relates to a bearing assembly, including a first race including a plurality of first race apertures configured to receive a plurality of first fasteners to couple the first race to a lower flange; a second race rotatably coupled to the first race and defining a fluid flow pathway therethrough, the second race including a top side; a bottom side facing the first race; a plurality of second race apertures configured to receive a plurality of second fasteners configured to couple the second race to an upper flange; and a plurality of access apertures configured to enable access to and removal of the plurality of first fasteners from the top side while the first race is coupled to the lower flange and the second race is coupled to the first race.

DETAILED DESCRIPTION

Figure 1:
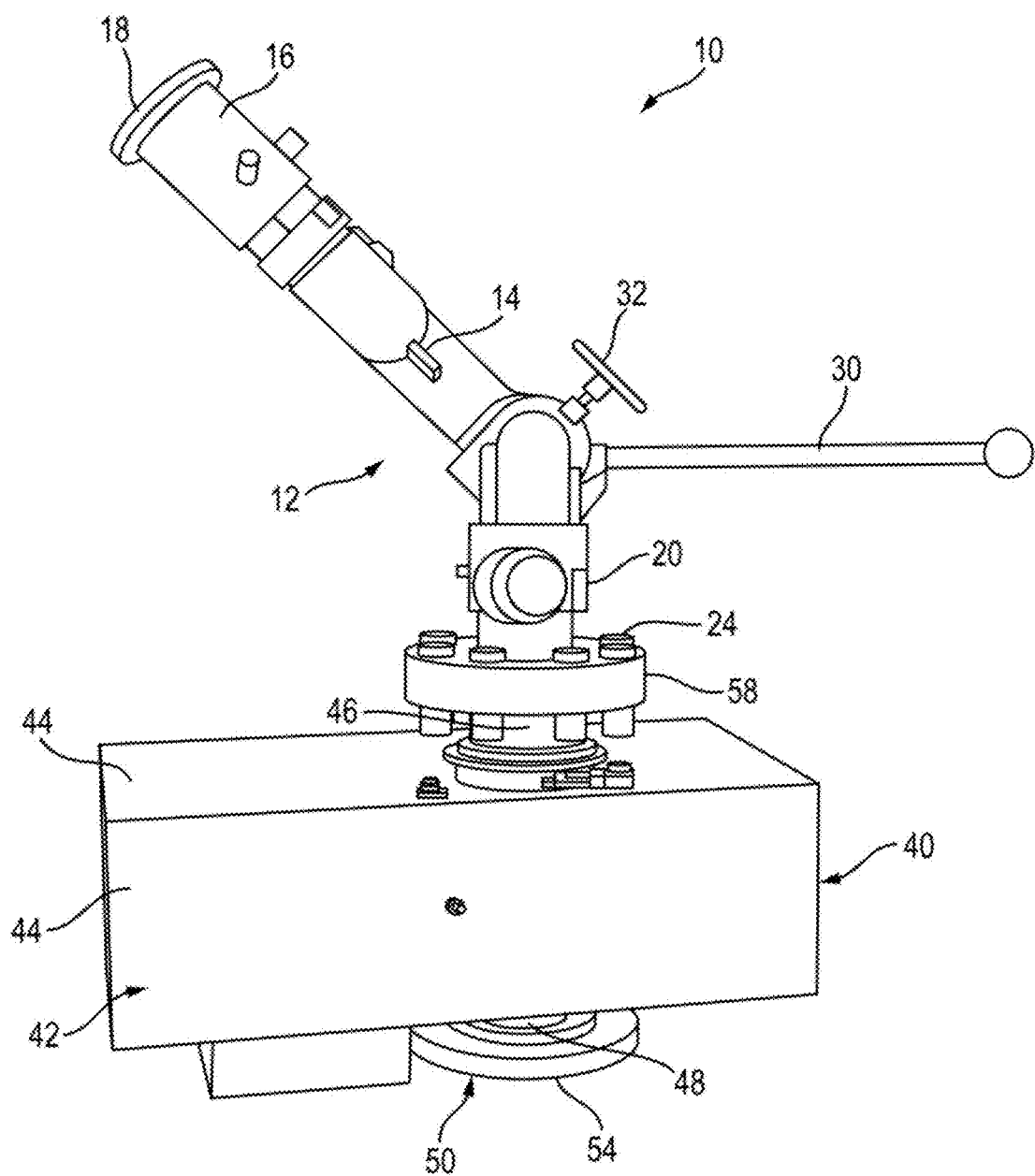
FIG. 1 is a perspective view of a discharge system for a fire suppression system, according to one embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Large open areas (e.g., airplane hangars, refineries, tank farms, docks, railroad yards, paper mills, chemical processing plants, etc.) commonly having combustible fluid near heated material. The combination of large open areas containing large quantities of combustible fluid and the proximity of heated material can cause fires to occur. Fire suppression systems can be installed in the open areas to suppress such fires.

Many these areas have the possibility of widespread and dangerous fires occurring. The fires can be too dangerous (e.g., hot, volatile, etc.) for a person to approach with a smaller fire suppression system (e.g., handheld extinguishers, etc.). Fire suppression systems able to supply large quantities of fire suppressant onto the hazard area in a short period are implemented in such applications. The fire suppression systems generally utilize an oscillating monitor that is configured to facilitate oscillating a nozzle to direct a spray of fire suppressant agent over an arc (e.g., 10°, 50°, 120°, etc.). The oscillating monitor aids in spreading the fire suppressant agent over the hazard such that the fire is prevented from spreading.

The oscillating monitor facilitates unaided oscillation by redirecting a small amount of flow from an input water or other fluid source to a mechanical power source (e.g., piston, gear, etc.) to generate movement of an oscillating member. In certain applications, the oscillating monitor utilizes ball bearings (e.g., casted brass bearings, etc.) to facilitate oscillation of the oscillating components. Some oscillating monitors may be assembled in pieces and welded together such that the ball bearings are irremovable. In such cases, the oscillating monitor may have a run life of 1-8 hours before the ball bearings wear and become inoperable, and the oscillating monitor must be replaced before the fire suppression system can be operable again. As such, various embodiments disclosed herein are directed to a bearing assembly that facilitates the servicing of oscillating monitors and the associated bearing assemblies.

Referring generally to the figures, a bearing assembly for an oscillating monitor is shown. The bearing assembly in one embodiment includes a connection flange, an outer race, an inner race, one or more ball bearings, one or more annular sealing members, and one or more fasteners. The bearing assembly facilitates replacement of the bearings without need to replace one or more other components of the bearing assembly. The bearing assembly also facilitates replacement of the bearings by means of one direction/side of access to the oscillating monitor.

Fire Suppression System

Referring to FIG. 1, a discharge system 10 for a fire suppression system is shown according to an exemplary embodiment. In one embodiment, the fire suppression system is a chemical fire suppression system. The fire suppression system is configured to dispense or distribute a fire suppressant agent onto and/or nearby a fire, extinguishing the fire and preventing the fire from spreading. The fire suppression system can be used in a variety of different applications (e.g., aircraft hangers, fueling areas, helipads, refineries, tank farms, docks, railroad yards, mills, etc.). Different applications can require different types of fire suppressant agent and different levels of mobility. The fire suppression system can use a variety of fire suppressant agents, such as powders, liquids, foams, or other fluid or flowable materials. By way of example, the fire suppression system may be in an aircraft hangar (e.g., for fuel fires, hydraulic fluid fires, etc.), at filling stations (e.g., for gasoline or propane fires, etc.), or in other stationary applications.

The discharge system 10 fluidly couples to a source (e.g., a reservoir, a tank, etc.) of fire suppressant agent within the fire suppression system. The discharge system 10 is configured to facilitate forming and aiming a spray pattern (e.g., a discharge, a flow, etc.) of fire suppressant agent to a desired location. The discharge system 10 includes a nozzle 12 (e.g., a spray device), which is configured to release and direct the fire suppressant agent towards a desired location, and an oscillating monitor 40, configured to oscillate the nozzle 12 along a specified range of rotation (e.g., 45° clockwise from a neutral position to 45° counter-clockwise from the neutral position and back).

The nozzle 12 includes a body 14 configured to contain one or more components of the nozzle 12 and facilitate interaction between the components. The body 14 includes a nozzle outlet 18 (e.g., an aperture) located at a first end region 16, configured to release fire suppressant agent towards a location (e.g., a fire). The nozzle 12 includes a nozzle inlet located on a second end region 20 of the nozzle 12. The second end region 20 and the first end region 16 of the nozzle 12 are located opposite each other on the body 14. The nozzle inlet is configured to fluidly communicate with the oscillating monitor 40 to allow fluid flow from the oscillating monitor 40 to the nozzle 12. The nozzle inlet is defined by a nozzle flange 24 (e.g., a flange member, etc.), located at the second end region 20 and configured to couple to the oscillating monitor 40. The nozzle flange 24 includes one or more nozzle apertures (e.g., threaded holes, apertures, etc.), located on and extending through the nozzle flange 24. The nozzle apertures are configured to receive fasteners (e.g., a bolt, a screw, a rivet, etc.). The fasteners are configured to fixedly couple the nozzle 12 to the oscillating monitor 40 such that when the oscillating monitor 40 rotates, the nozzle 12 also rotates. The nozzle 12 further includes a movement arm 30 that extends from the body 14. The movement arm 30 is configured to facilitate movement of the nozzle 12 by a user. An elevation lock 32 (e.g., a locking mechanism) may be included in the nozzle 12 and configured to prevent the nozzle 12 from changing elevation during operation.

Figure 2:
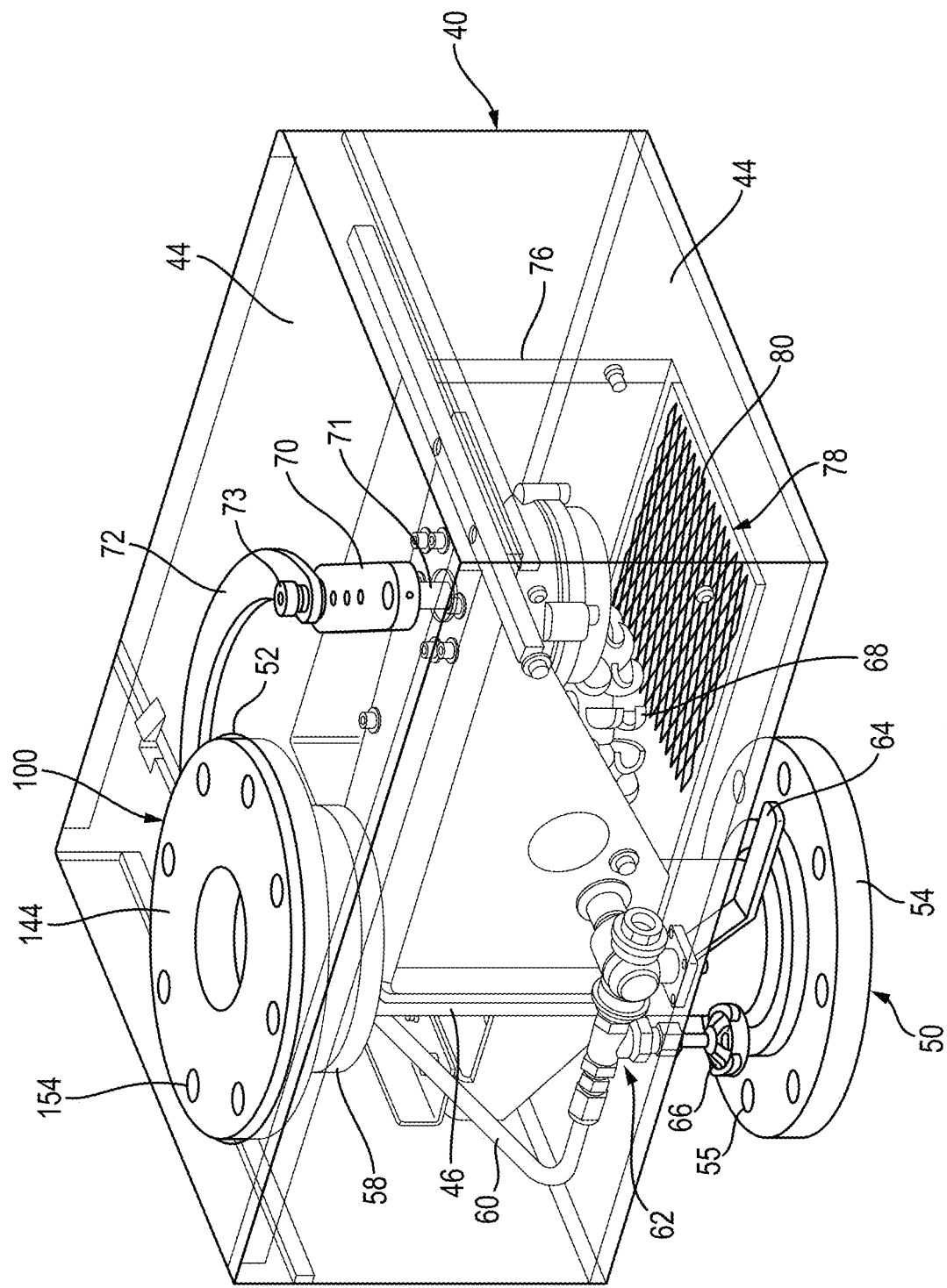
FIG. 2 is a perspective view of an oscillating monitor usable with the discharge system of FIG. 1 according to one embodiment.
Figure 3:
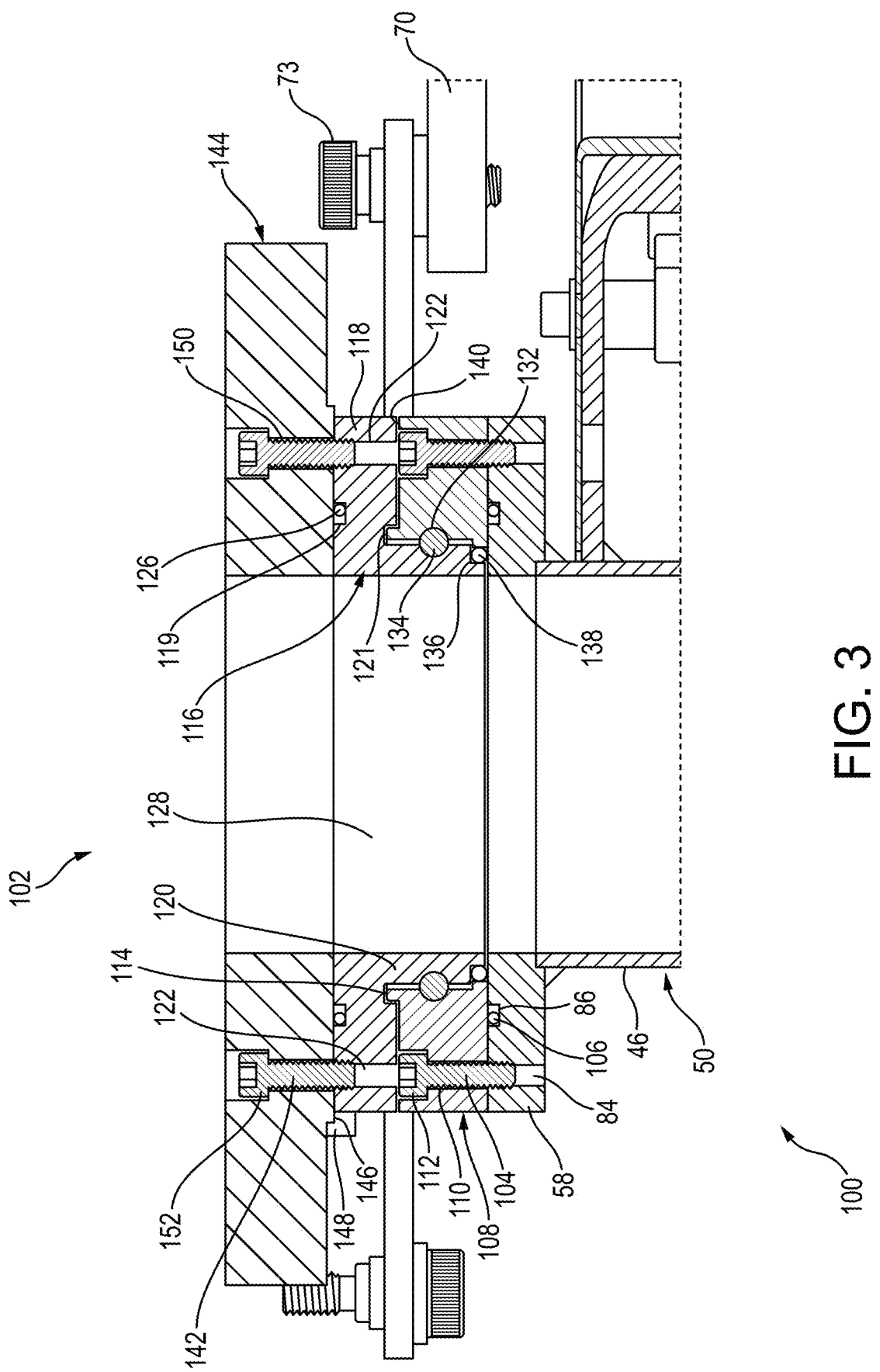
FIG. 3 is a perspective view of a bearing assembly usable with the oscillating monitor of FIG. 2 according to one embodiment.
Figure 4:
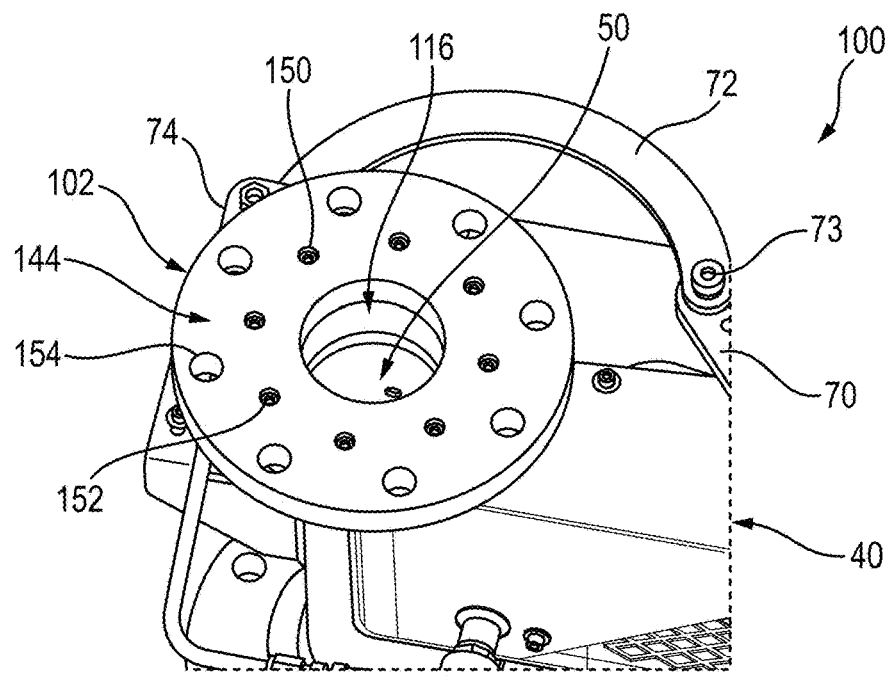
FIG. 4 is another perspective view of the bearing assembly of FIG. 3.
Figure 5:
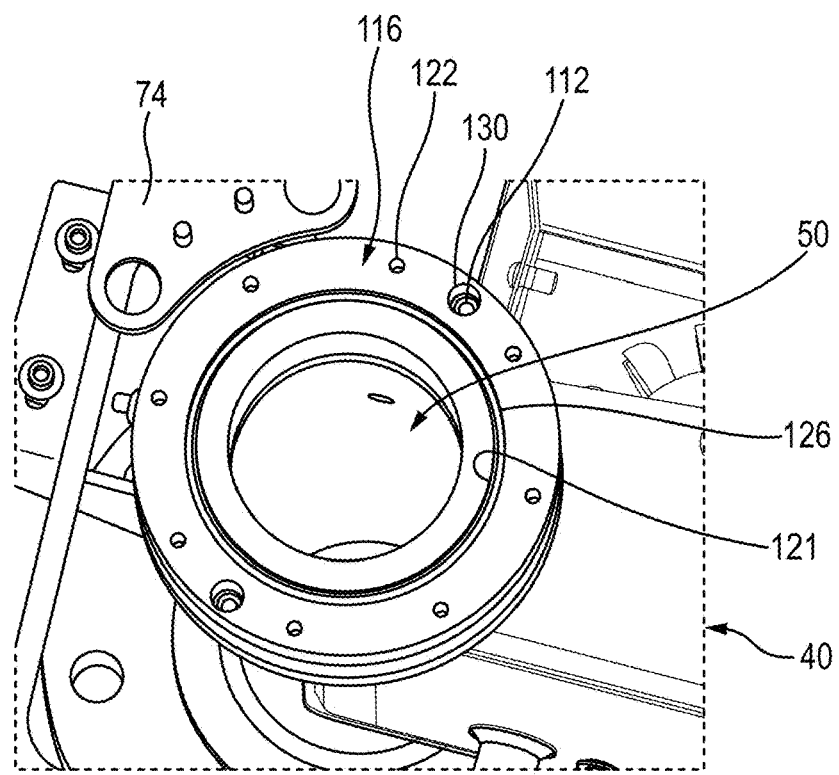
FIG. 5 is a perspective view of a portion of the bearing assembly of FIG. 3.
Figure 6:
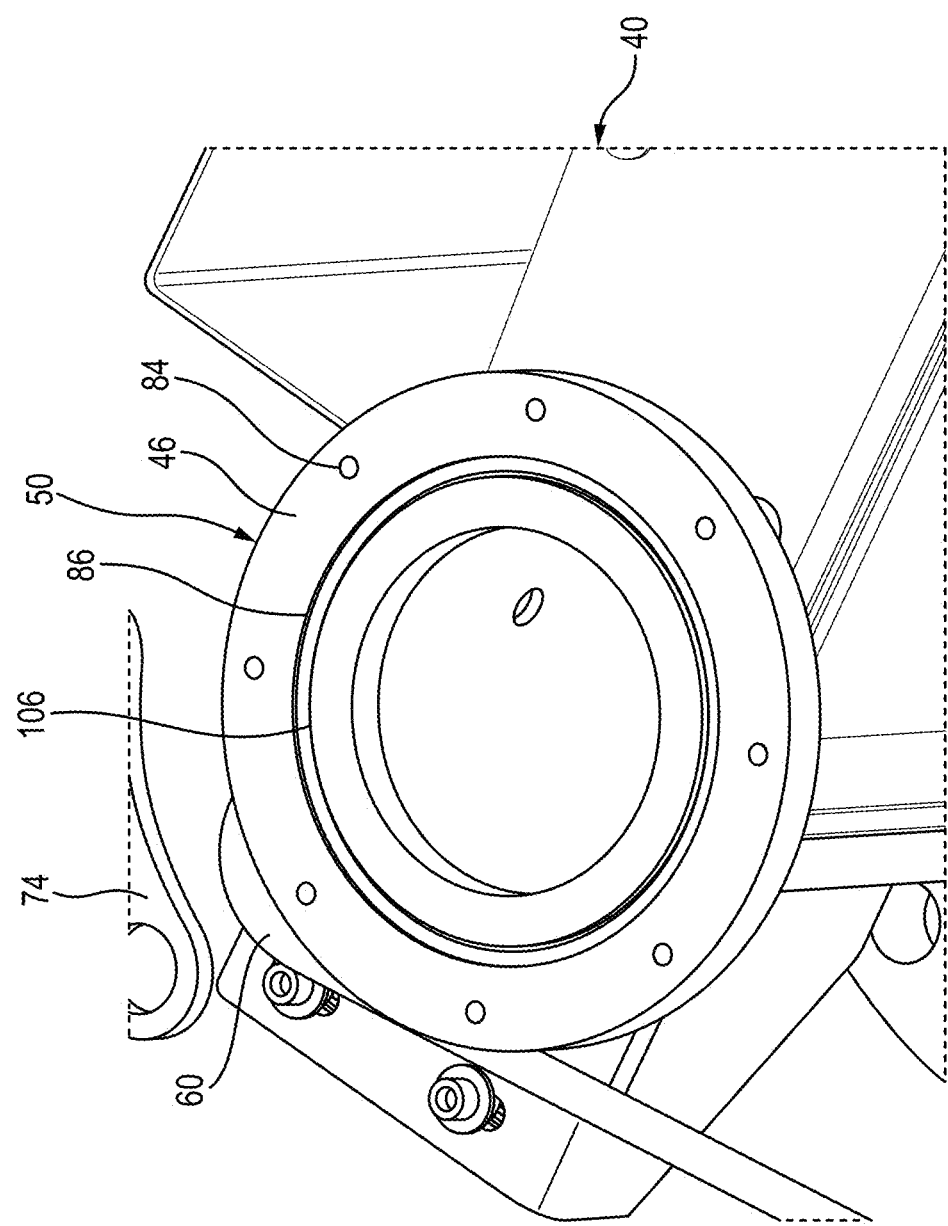
FIG. 6 is another perspective view of a portion of the bearing assembly of FIG. 3.

Referring to FIGS. 1 and 2, the discharge system 10, as described above, includes the oscillating monitor 40. The oscillating monitor 40 is configured to facilitate oscillation of the nozzle 12 during operation of the fire suppression system. The oscillating monitor 40 includes a shell 42 (e.g., a casing, housing, etc.), configured to contain the components of the oscillating monitor 40 to facilitate correct operation. The shell 42 can include one or more walls 44 (e.g., planar side portions), configured to prevent unwanted material (e.g., dirt, debris, etc.) from entering the oscillating monitor 40. Each of the walls 44 can extend perpendicular and/or parallel to at least one of the other walls 44. The walls 44 define an inner cavity which is configured to contain one or more components of the oscillating monitor 40 as well as provide space for the components to function correctly. The shell 42 may include an open side, such that the inner cavity is accessible via the open side.

The oscillating monitor 40 includes a main flow pipe 50 (e.g., an elongated cylinder, conduit, etc.) extending between a top end region 46 and a bottom end region 48, shown as. The main flow pipe 50 may be configured to fluidly communicate with a conduit (e.g., a hose, a pipe, a tube, etc.) and/or the nozzle inlet. The main flow pipe 50 can protrude from the shell 42 on the top end and/or the bottom end. The shell 42 is configured to include a shell access port 52 (e.g., an aperture, an opening, etc.) located and extending through one of the walls 44. The shell access port 52 may allow the main flow pipe 50 or another component of the oscillating monitor 40 to extend out of the shell 42 and be accessible without removing the shell 42. The main flow pipe 50 includes an aperture extending between a first end and a second end of the main flow pipe 50 configured to facilitate flow through the main flow pipe 50 from the first end to the second end.

The main flow pipe 50 includes a radial protrusion, shown as first pipe flange 54, located on a distal end of the main flow pipe 50 and external to the shell 42. The first pipe flange 54 can extend radially outward from a surface of the main flow pipe 50 to form a secondary surface to which components can be coupled. The first pipe flange 54 includes one or more pipe fastener apertures 55 (e.g., tapped holes, openings, etc.) spaced along a periphery of the first pipe flange 54. The pipe fastener apertures 55 are configured to accept a fastener (e.g., a bolt, a screw, a rivet, etc.) to fixedly couple one or more components (e.g., a hose, a pipe, etc.) to the first pipe flange 54. The first pipe flange 54 defines a pipe inlet. The pipe inlet is configured to facilitate flow of a fluid into the aperture extending between the first end and the second end. The main flow pipe 50 includes a second pipe flange 58 (e.g., a radial protrusion) located on an opposite end of the first pipe flange 54. The second pipe flange 58 is configured to fixedly couple to a bearing assembly 102. The second pipe flange 58 defines a pipe outlet configured to allow flow to exit the main flow pipe 50.

The oscillating monitor 40 also includes a side flow pipe 60 extending from the main flow pipe 50. The side flow pipe 60 can be positioned between the first end and the second end of the main flow pipe 50. The side flow pipe 60 is configured to receive a portion of the fluid flowing through the main flow pipe 50. The side flow pipe 60 includes an aperture (e.g., inlet, outlet, etc.) extending through a wall of the main flow pipe 50 to facilitate fluid communication between the side flow pipe 60 and the main flow pipe 50. The side flow pipe 60 can couple to a valve 62 configured to control flow through the side flow pipe 60. The valve 62 can be located along a region of the side flow pipe 60 such that the valve 62 can restrict/allow flow through the side flow pipe 60. The valve 62 can include a lever 64 and/or a knob 66, each configured to facilitate movement of the valve 62 to prevent or limit the flow within the side flow pipe 60. The side flow pipe 60 is configured to direct the portion of fluid received from the main flow pipe 50 to a water wheel 68 (e.g., a rotational device) or other oscillating device. The portion of fluid received from the main flow pipe 50 is discharged from the side flow pipe 60 via an outlet, and the discharged fluid impacts the water wheel 68, resulting in rotation of the water wheel 68 due to a force exerted by the fluid impacting the water wheel 68.

In some embodiments, the water wheel 68 can be coupled to a gearbox 69 via a drive shaft 71 (e.g., a rod, etc.), such that when the water wheel 68 rotates, the gearbox 69 rotates with the same rotational velocity as the water wheel 68. The water wheel 68 may also fixedly couple to a first gear and the first gear couples to a second gear fixedly coupled to the gearbox 69. The drive shaft 71 is fixedly coupled to a rotational arm 70 (e.g., an elongated member, etc.). The rotational arm 70 includes a first aperture positioned at a first end of the rotational arm 70 and extending through the rotational arm 70. The first aperture is configured to accept the drive shaft 71 and facilitate fixedly coupling of the rotational arm 70 to the drive shaft 71. As the drive shaft 71 rotates, the rotational arm 70 also rotates at the same rotational velocity. The rotational arm 70 also includes one or more second apertures, located toward a second end of the rotational arm 70 and extending through the rotational arm 70. The second apertures are configured to accept a fastener 73 that rotationally couples the rotational arm 70 to curved arm 72 (e.g., an elongated member). The curved arm 72 couples to the rotational arm 70 and to attachment member 74. The curved arm 72 is configured to translate along a defined path as the rotational arm 70 rotates. The attachment member 74 couples to the bearing assembly 102 to facilitate rotation of the bearing assembly 102 as the curved arm 72 translates due to the rotation of the rotational arm 70 from the rotation of the drive shaft 71. Therefore, as fluid flows through the main flow pipe 50 and the valve 62 is in an open configuration, a portion of the fluid can be received by the side flow pipe 60 and directed towards the water wheel 68, such that the bearing assembly 102 may rotate automatically (e.g., with no human interaction, etc.).

The oscillating monitor 40 includes an inner shell 76 (e.g., an inner housing, etc.), which can include the water wheel 68, the gearbox 69, and/or a portion of the drive shaft 71. The inner shell 76 can further be configured to prevent access to the water wheel 68, the gearbox 69, and the portion of the drive shaft 71 within the inner shell 76. The inner shell 76 can include a leak opening 78 (e.g., an aperture, etc.), on a lower side of the inner shell 76. The leak opening 78 is configured to facilitate egress of the fluid from the inner shell 76 after discharge from the side flow pipe 60. The leak opening 78 can include a filter 80 (e.g., a filtering member) configured to prevent material (e.g., contaminants, fire suppression agent particles, etc.) from egressing from the inner shell 76 along with the fluid.

Referring to FIGS. 3-6, a rotational coupling 100 is shown. The rotational coupling 100 includes a bearing assembly 102 and the second pipe flange 58 (e.g., a fluid supply conduit or bottom or lower flange) of the main flow pipe 50. The second pipe flange 58 is configured to couple to the bearing assembly 102. The bearing assembly 102 includes a first bearing race 108 (e.g., a bearing member, a first, lower, or bottom race or member, an outer race, etc.), a second bearing race 116 (e.g., a second bearing, a second, upper, or top race or member, an inner race, etc.), and a connection flange 144 (e.g., a third member, a top or upper flange, etc.). The bearing assembly 102 can be coupled to the second pipe flange 58 as described above. The bearing assembly 102 is configured to facilitate rotation of the nozzle 12, which is fixedly coupled to the bearing assembly 102. In some embodiments, connection flange 144 is omitted from bearing assembly 102 and provided as a separate component or as part of rotational coupling 100.

A first side (e.g., bottom side) of the connection flange 144 is configured to be coupled to the second bearing race 116. In one embodiment, the connection flange 144 is fixedly coupled to the second bearing race 116 by a plurality of second fasteners 142. The second bearing race 116 is rotatably coupled to the first bearing race 108. A plurality of bearings 134 (e.g., ball bearings, slanted bearings, etc.) provide an interface between the second bearing race 116 and the first bearing race 108. The first bearing race 108 is fixedly coupled to the second pipe flange 58 by a plurality of first fasteners 104. The bearing assembly 102 provides relative rotational movement between the oscillating monitor 40 (coupled to the first bearing race 108) and the nozzle 12 (coupled to the second bearing race 116), and a sealed fluid flow path between these components. As discussed in greater detail below, the components of the bearing assembly 102 can be removed via access from a second side (e.g., a top side, etc.) of the connection flange 144, thereby facilitating maintenance of the bearing assembly 102.

The second pipe flange 58 can include one or more first apertures 84 located on and extending through the second pipe flange 58. One or more first fasteners 104 (e.g., bolts, screws, rivets, etc.) are configured to extend through the first apertures 84 to fixedly couple the bearing assembly 102 to the second pipe flange 58. The second pipe flange 58 further may include a first groove 86 (e.g., a cutout, a notch, a divot, etc.) located on a first side (e.g., a top side, an outer side, etc.). The first groove 86 is configured to accept a first sealing member 106 (e.g., a deforming member, an O-ring, a seal, etc.). The first sealing member 106 is configured to form a water tight seal between the second pipe flange 58 and the first bearing race 108 of the bearing assembly 102.

The first bearing race 108 may be a generally ring shaped member that may be configured to form an outer race for the bearings 134. The first bearing race 108 also includes one or more second apertures 110 (e.g., tapped hole, opening, etc.), which may extend at least partially from a first side (e.g., a top side) of the first bearing race 108 to a second side (e.g., a bottom side) of the first bearing race 108. The first side and the second side can be located opposite of each other on the first bearing race 108. The second apertures 110 includes a first inner diameter and a second inner diameter. The first inner diameter and the second inner diameter can be equal or different. By way of example the first inner diameter is larger than the second inner diameter and is configured to accept a head 112 (e.g., a larger diameter region) of the first fasteners 104. The second side of the first bearing race 108 can couple to the first side of the second pipe flange 58. The first side of the first bearing race 108 can include first protrusion 114 (e.g., an extension) extending upward. The first protrusion 114 can facilitate alignment of the second bearing race 116 onto the first bearing race 108 during assembly of the bearing assembly 102. In some embodiments, the first protrusion 114 is projection such as an annular projection that is received within a groove such as an annular groove in the second bearing race 116.

The second bearing race 116 couples to the first side of the connection flange 144. The second bearing race 116 can be configured to form an inner race for the bearings 134. The second bearing race 116 includes a race flange 118 (e.g., a flange member, a protrusion, etc.) extending radially outward from a body 120. The race flange 118 includes one or more third apertures 122, extending at least partially between a first side (e.g., a top side) of the race flange 118 to a second side (e.g., a bottom side) of the race flange 118. The third apertures 122 are configured to each accept a second fastener 142. The first side of the race flange 118 includes second groove 119 (e.g., a notch, a divot, a cutout, etc.) configured to accept second sealing member 126. The second groove 119 and the second sealing member 126 are configured to extend along a periphery of the second bearing race 116. The second bearing race 116 includes a flow aperture 128 (e.g., a hole, an opening, etc.) extending between a first side (e.g., a top side) and a second side (e.g., a bottom side) of the body 120. The first side of the body 120 and the first side of the race flange 118 may be coincident. The flow aperture 128 can align with the aperture extending between the top end region 46 and the bottom end region 48 of the main flow pipe 50. The second bearing race 116 also may include a third groove 121 extending around the periphery of the race flange 118 and located on the second side of the race flange 118. The third groove 121 is configured to accept the first protrusion 114 of the first bearing race 108.

The second bearing race 116 also includes one or more access apertures 130 configured to facilitate access to and removal of the first fasteners 104 when the bearing assembly 102 is coupled to the flange 208. The access apertures 130 are defined within and extending through the second bearing race 116. In some embodiments, the second bearing race 116 includes less than eight access apertures 130 to facilitate access to a first group of first fasteners 104 (e.g., to provide access to a first portion of first fasteners 104 at a first rotational position of second bearing race 116). In this embodiment, the second bearing race 116 can be rotated to facilitate access to a next group of first apertures 104 (e.g., to provide access to a second portion of first fasteners 104 at a second rotational position of second bearing race 116). The second bearing race 116 can be rotated a number of times equal to the number of first fasteners 104 to facilitate removal of the first fasteners 104. Removal of the first fasteners 104 facilitates removal of the bearing assembly 102 from the pipe flange 58.

When the first bearing race 108 and the second bearing race 116 are coupled, bearing cavity 132 may be formed between the first bearing race 108 and the second bearing race 116. The bearing cavity 132 is configured to accept the bearings 134. The bearings 134 are configured to facilitate rotation of the second bearing race 116 with respect to the first bearing race 108. The bearings 134 may be configured to move (e.g., roll) within the bearing cavity 132 during oscillation of the oscillating monitor 40 to prevent the first bearing race 108 and second bearing race 116 from contacting and causing damage to each other. One example of a material suitable for the bearings 134 is stainless steel. In some embodiments, the bearings 134 can be removed (e.g., change, serviced, etc.) by a technician via removal of the second bearing race 116 from the first bearing race 108. Generally, the bearings 134 fail in an oscillating monitor 40 and need to be replaced before other components. Removal of the bearings 134 can lower the cost of maintenance of the oscillating monitor 40, as replacement of the bearings 134 is less expensive than replacing the entirety of the bearing assembly 102.

Also when the first bearing race 108 and the second bearing race 116 are coupled, sealing member cavity 136 may be formed between the first bearing race 108 and the second bearing race 116. The sealing member cavity 136 is configured to accept third sealing member 138 (e.g., a deforming member, an O-ring, etc.). The third sealing member 138 interfaces with one or more of the first side of the second pipe flange 58, the first bearing race 108, and the second bearing race 116. The third sealing member 138 is configured to form a water tight seal between an inside of the bearing assembly 102 and an outside of the bearing assembly 102 to prevent egress of fluid into a gap 140 defined between the first bearing race 108 and the second bearing race 116. The third sealing member 138 may be located radially inward of, outward of, or aligned with, the first sealing member 106.

The bearing assembly 102 also includes the connection flange 144. Connection flange 144 couples to the first side of the second bearing race 116. The second sealing member 126 can be located between first side of the connection flange 144 and the second bearing race 116. The connection flange 144 is configured to facilitate oscillation of the bearing assembly 102 via coupling to the attachment member 74. The connection flange 144 may include a coupling shoulder 146 configured to assist placement of the second race member on the connection flange 144 when assembling the bearing assembly 102. The coupling shoulder 146 couples to second protrusion 148 of the second bearing race 116 and may extend along the periphery of the race flange 118. The connection flange 144 is configured to extend radially outward of the second pipe flange 58, the first bearing race 108, and the second bearing race 116. The connection flange 144 includes one or more fourth apertures 150, and one or more coupling apertures 154. The fourth apertures 150 are configured to extend from a second side (e.g., a top side) to the first side of the connection flange 144 and can align with the third apertures 122 of the second bearing race 116 and to accept the second fasteners 142. In some embodiments, the fourth apertures 150 include a first inner diameter and a second inner diameter. The first inner diameter can be equal or different (e.g., larger, smaller, etc.) than the second inner diameter. By way of example, the first inner diameter is larger than the second inner diameter. The first inner diameter can be configured to accept a head 152 (e.g., a larger diameter region) of the second fasteners 142. The coupling apertures 154 are configured to accept a fastener that fixedly couples the connection flange 144 to the attachment member 74 to facilitate rotation of the bearing assembly 102 relative to the main flow pipe 50.

Figure 7:
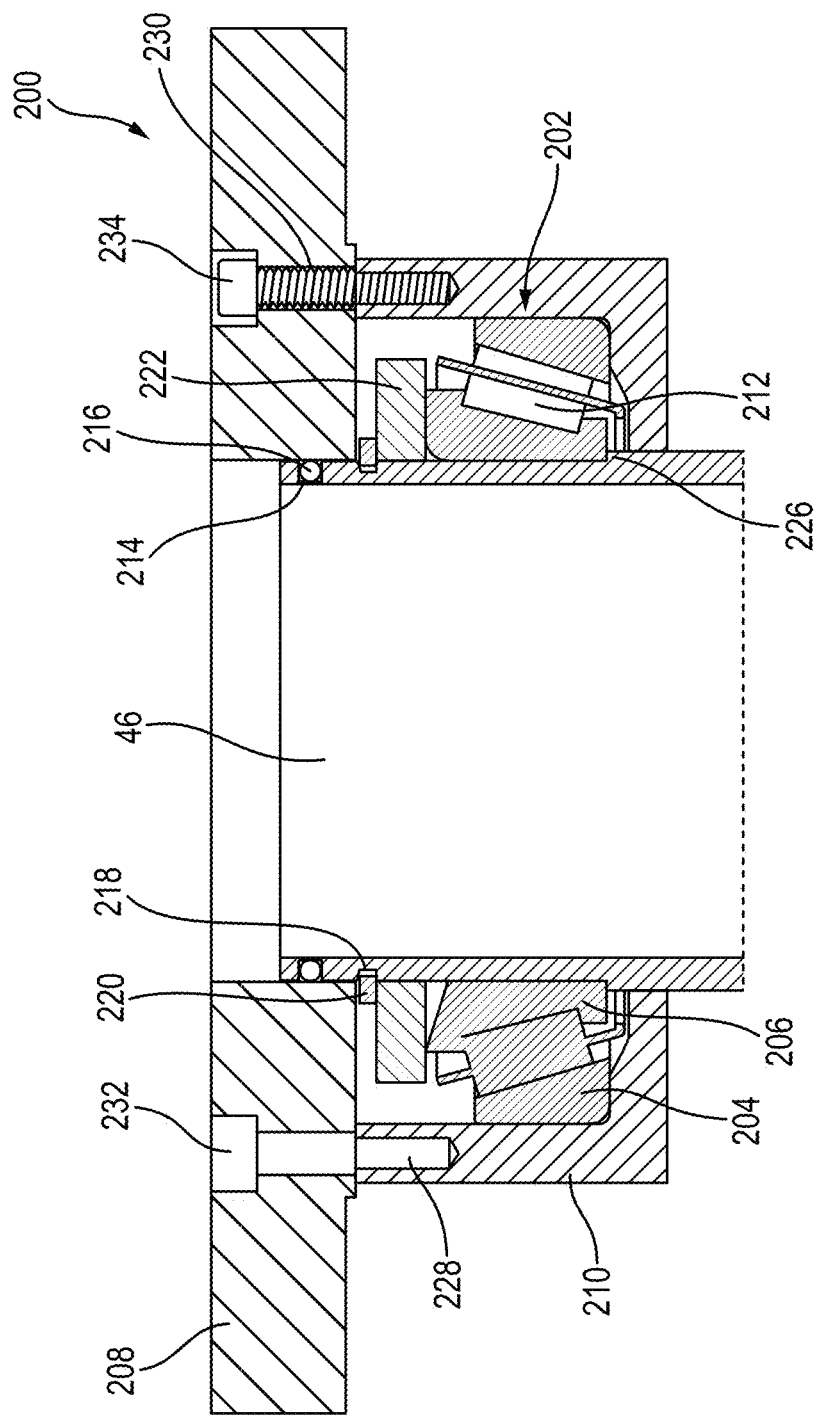
FIG. 7 is a cross-sectional view of another bearing assembly usable with the oscillating monitor of FIG. 2 according to another embodiment.
Figure 8:
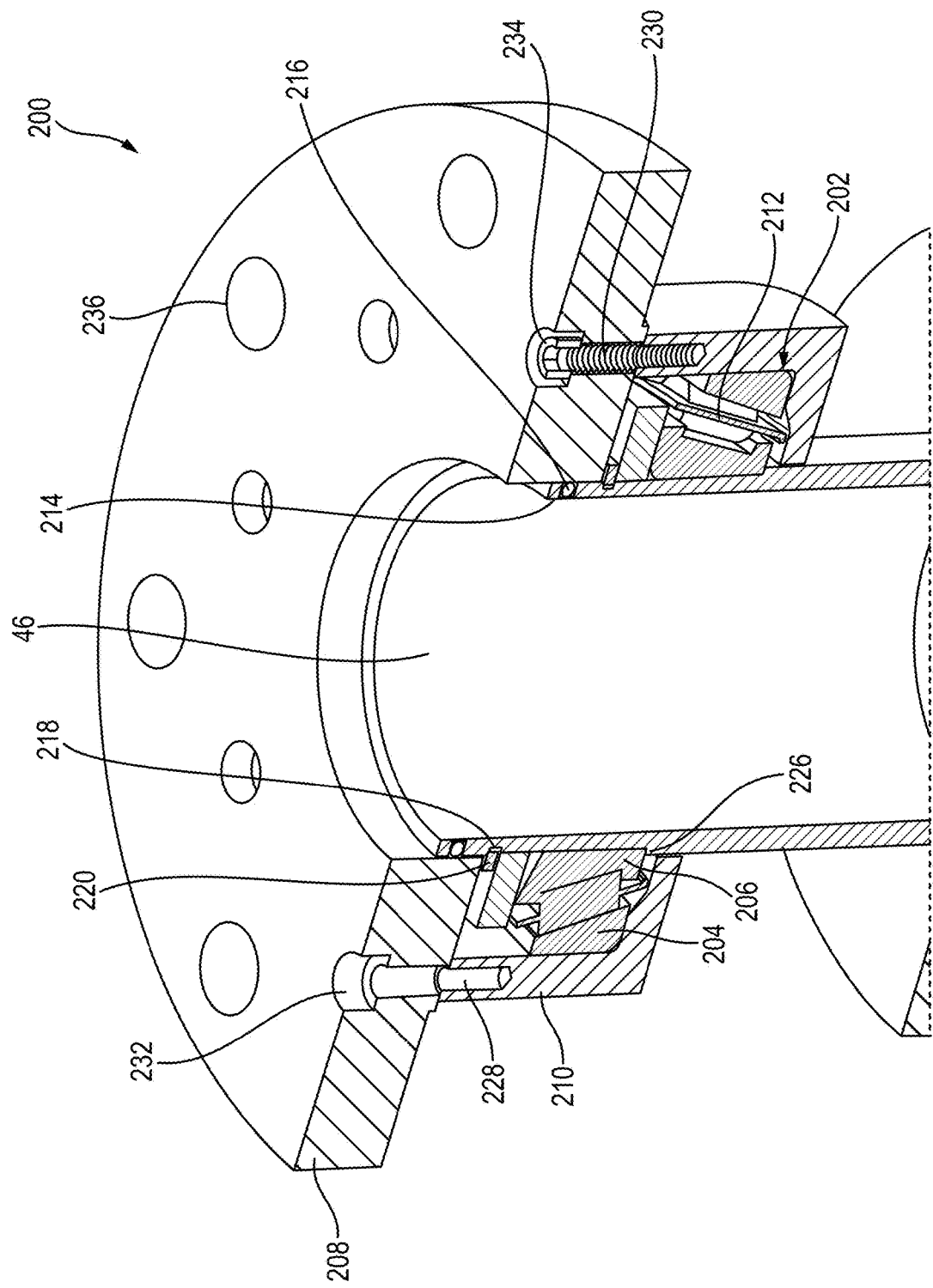
FIG. 8 is a perspective cross-sectional view of the bearing assembly of FIG. 7.

Referring to FIGS. 7 and 8, the rotational coupling 200 is shown according to one embodiment. The rotational coupling 200 includes a second bearing assembly 202, and the main flow pipe 50 of the oscillating monitor 40. The second bearing assembly 202 couples to the main flow pipe 50 of the oscillating monitor 40. The second bearing assembly 202 includes first bearing race 204 (e.g., inner race, bearing member, etc.), second bearing race 206 (e.g., outer race, bearing member, etc.), flange 208, and body 210. The second bearing assembly 202 may couple (e.g., fixedly, removably, etc.) to the main flow pipe 50. The second bearing assembly 202 is configured to facilitate rotation of the nozzle 12 relative to the main flow pipe 50.

A first side (e.g., bottom side) of the flange 208 is coupled to the body 210. The body 210 is coupled (e.g., fixedly, removably, etc.) to the second bearing race 206. The second bearing race 206 is rotatably coupled to the first bearing race 204. A plurality of bearings 212 (e.g., ball bearings, slanted bearings, bearings, etc.) provide an interface between the second bearing race 206 and the first bearing race 204. The first bearing race 204 is fixedly coupled to an outer surface of the main flow pipe 50. The second bearing assembly 202 provides relative rotation between the oscillating monitor 40 and the nozzle 12. As discussed in greater detail below, the components of the second bearing assembly 202 can be accessed via removal of the connection flange 144.

The second bearing assembly 202 couples to the outer surface of the main flow pipe 50 of the oscillating monitor 40. The main flow pipe 50 includes sealing groove 214 (e.g., indent, cutout, notch, etc.) that extends around a perimeter of the main flow pipe 50 and is configured to extend below the outer surface. The sealing groove 214 is configured to accept sealing member 216 (e.g., deforming member, O-ring, seal, etc.). The sealing member 216 may be an annular body that can deform (e.g., the cross sectional shape can change) and may be configured to form a water-tight seal between the flange 208 and the main flow pipe 50. The sealing groove 214 is located towards the top end region 46 of the main flow pipe 50. The main flow pipe 50 can include fastener groove 218 (e.g., indent, cutout, notch, etc.). The fastener groove 218 may extend around the perimeter of the outer surface of the main flow pipe 50 and may be located further from or closer to the top end region 46 than the sealing groove 214. The fastener groove 218 is configured to accept a retention member 220 (e.g., a snap ring, a fastener flange, a removable flange, a rigid member, etc.). The retention member 220 interfaces with the flange 208 to reduce downward movement (e.g., translation, rotation, etc.) of the flange 208 relative to the top end region 46 of the main flow pipe 50.

The second bearing assembly 202 also includes a rigid ring 222 (e.g., a rigid member, a plastic ring, a washer, etc.). A first side (e.g., a top side) of the rigid ring 222 interfaces with a second side (e.g., a bottom side) of the retention member 220, the outer surface of the main flow pipe 50. A second side (e.g., a bottom side) of the rigid ring 222 interfaces with a first side (e.g., a top side) of the first bearing race 204.

The second bearing assembly 202 includes one or more bearings 212 (e.g., slanted bearing, ball bearings, friction reducing member, etc.). The bearing 212 interface with the first bearing race 204, and the second bearing race 206. The bearing 212 facilitates rotation of the second bearing race 206 with respect to the first bearing race 204. The bearings 212 may be accessed (e.g., removed, changed, fixed, etc.) via removal of the body 210 and the flange 208. In some embodiments, the bearings 212 may be oriented parallel to the main flow pipe 50. In other embodiments, the bearings 212 may be oriented angled relative to the main flow pipe 50.

The first bearing race 204 interfaces with the bearing 212 and the outer surface of the main flow pipe 50. The outer surface of the main flow pipe 50 can include a shoulder 226 (e.g., a protrusion, a flange, etc.) located further from the top end region 46 than the sealing groove 214 and the fastener groove 218. A lower side of the first bearing race 204 interfaces with the shoulder 226 to minimize downward translation of the first bearing race 204 relative to the rigid ring 222. An upper side of the first bearing race 204 interfaces with the rigid ring 222 to minimize upward translation of the first bearing race 204 relative to the shoulder 226. When the upper side of the first bearing race 204 interfaces with the rigid ring 222 and the lower side of the first bearing race 204 is coupled to the shoulder 226, the first bearing race 204 is fixedly coupled within the second bearing assembly 202.

The second bearing assembly 202 includes the body 210. The body 210 is configured to interfaces with the outer surface of the main flow pipe 50, the flange 208, and to the second bearing race 206. The body 210 is configured to fixedly couple to the second bearing race 206 such that the body 210 and the second bearing race 206 rotate as a single component with respect to the first bearing race 204 and the main flow pipe 50 during rotation of the oscillating monitor 40. The body 210 can be L-shaped and define a cavity that contains the first bearing race 204, the second bearing race 206, the retention member 220, the rigid ring 222, and/or the bearing 212. The body 210 can include first apertures 228 (e.g., tapped holes, threaded holes, etc.) that extend a distance into the body 210. The first apertures 228 can each be configured to accept at least a portion of an assembly fastener 230 (e.g., a bolt, a screw, a rivet, etc.).

The second bearing assembly 202 also includes the flange 208. The flange 208 may be coupled to the main flow pipe 50, the body 210, the attachment member 74, and the nozzle 12. The flange 208 may be configured to facilitate rotation of the nozzle 12 during oscillation of the oscillating monitor 40. The flange 208 includes second apertures 232 extending between the first side and a second side (e.g., a top side) of the flange 208. The second apertures 232 may have a first diameter and a second diameter. The first diameter and the second diameter can equal or unequal. By way of example, the first inner diameter is larger than the second inner diameter. The first inner diameter is configured to receive a head 234 (e.g., a large diameter region) of the assembly fasteners 230. The second apertures 232 may be configured to align with the first apertures 228, such that the assembly fasteners 230 can extend through the second apertures 232 into the first apertures 228. The body 210 and the flange 208 are fixedly coupled when the assembly fasteners 230 are accepted by the first apertures 228 and the second apertures 232.

The assembly fasteners 230, when accepted by both the first apertures 228 of the body 210 and the second apertures 232 of the flange 208, are configured to fixedly couple the flange 208 to the body 210 forming an assembled configuration. In the assembled configuration, the first side of the flange 208 interfaces with the first side of the retention member 220, and an inner surface of the flange 208 interfaces with the outer surface of the main flow pipe 50 and the sealing member 216. The second side of the retention member 220 interfaces with the first side of the rigid ring 222 and a portion of the retention member 220 couples to the fastener groove 218 of the main flow pipe 50. An inner surface of the rigid ring 222 interfaces with the outer surface of the main flow pipe 50 and the second side of the rigid ring 222 interfaces with the first surface of the first bearing race 204. The inner side of the first bearing race 204 interfaces with the outer surface of the main flow pipe 50. The outer surface of the first bearing race 204 interfaces with the bearings 212. The second surface of the first bearing race 204 interfaces with the shoulder 226 of the main flow pipe 50, fixedly coupling the flange 208, the retention member 220, the rigid ring 222, and the first bearing race 204. The second bearing race 206 interfaces with the bearings 212 on an inner side. The second side (e.g., an outer side, etc.) of the second bearing race 206 fixedly couples to an inner side of the body 210.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, and/or illustrations of possible embodiments (and such terms are not intended to connote that such embodiments are necessarily extraordinary or superlative examples).

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. Such members may be coupled mechanically, electrically, and/or fluidly.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the rotational coupling and bearing assembly as shown in the various exemplary embodiments is illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

Additionally, any element disclosed in one embodiment may be incorporated or utilized with any other embodiment disclosed herein. For example, the connection flange 144 may be incorporated in the second bearing race 116. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A rotatable fluid coupling for a fluid discharge device, the rotatable fluid coupling comprising:
   a bearing including a first member rotatably coupled with a second member; and
   a fastener configured to couple the first member with a fluid supply conduit, wherein the second member comprises an opening to access the fastener for installation and removal of the bearing, and the first member and the second member define an inner volume and are sealed with each other, the inner volume defining a flow path for a fluid from the fluid supply conduit to the fluid discharge device.

2. The rotatable fluid coupling of claim 1, wherein the first member is an outer race of the bearing and the second member is an inner race of the bearing, the rotatable fluid coupling further comprising:
   a connection flange coupled to the inner race and configured to receive a plurality of fasteners to couple the connection flange to the inner race, wherein the inner race includes an annular protrusion that radially extends over the outer race, the annular protrusion including a first side facing the connection flange and a second side opposite the first side and facing the outer race, wherein the inner race includes a plurality of the opening to enable access to a plurality of the fastener that couple the outer race with the fluid supply conduit from the first side to removably couple the bearing to the fluid supply conduit.

3. The rotatable fluid coupling of claim 2, wherein the inner race includes a groove extending around a periphery of the first side configured to accept a sealing member.

4. The rotatable fluid coupling of claim 2, wherein the plurality of fasteners that couple the connection flange to the inner race and the plurality of fasteners that couple the outer race with the fluid supply conduit both extend in a same direction and comprise tool interface portions configured to be accessed from a same side of the rotatable fluid coupling.

5. The rotatable fluid coupling of claim 1, wherein a cavity configured to receive a seal is formed between the first member, the second member, and a first side of the fluid supply conduit.

6. The rotatable fluid coupling of claim 1, further comprising a plurality of ball bearings configured to facilitate rotation of the first member relative to the second member.

7. The rotatable fluid coupling of claim 1, wherein the plurality of first fasteners are received in a plurality of first apertures in the fluid supply conduit and a plurality of second apertures in the first member, and wherein the second member includes a plurality of third apertures configured to accept the plurality of second fasteners to couple a connection flange with the second member.

8. A bearing assembly, comprising:
a first member comprising a plurality of first apertures to receive a plurality of first fasteners to couple the first member to a first flange;
a second member rotatably coupled to the first member and defining a fluid flow pathway through the second member, the second member comprising:
a top side;
a bottom side facing the first member;
a plurality of second apertures to receive a plurality of second fasteners to couple the second member to a second flange; and
a plurality of access apertures to enable access to and removal of the plurality of first fasteners from the top side while the first member is coupled to the first flange and the second member is coupled to the first member.

9. The bearing assembly of claim 8, wherein a cavity configured to receive a seal is formed between the first member, the second member, and the first flange.

10. The bearing assembly of claim 8, further comprising a plurality of ball bearings configured to facilitate rotation of the first member relative to the second member.

11. The bearing assembly of claim 8, wherein the second member includes a groove extending around a periphery of the first side configured to receive a seal.

12. The bearing assembly of claim 8, wherein:
the plurality of access apertures are configured to align with a first portion of the plurality of first apertures based on the second member being at a first rotational position relative to the second member; and
the plurality of access apertures are configured to align with a second portion of the plurality of first apertures based on the second member being at a second rotational position relative to the first member.

13. The bearing assembly of claim 8, wherein the first member includes an annular projection configured to be received by the second member and align the second member relative to the first member.

14. The bearing assembly of claim 13, wherein the annular projection extends upward and is received in an annular groove formed in a bottom of the second member.

15. A fluid discharge assembly, comprising:
a fluid discharge device; and
an oscillating monitor coupled with the fluid discharge device, the oscillating monitor comprising:
a housing; and
a rotational coupling removably coupled with the housing to allow for rotation of the fluid discharge device relative to the housing, the rotational coupling having a fluid conduit to provide fluid to the fluid discharge device through the fluid conduit, the rotational coupling including a plurality of apertures to access fasteners for decoupling at least one of (i) the rotational coupling from the housing or (ii) a first member of the rotational coupling from a second member of the rotational coupling.

16. The fluid discharge assembly of claim 15, wherein the rotational coupling comprising a first member rotatably coupled with a second member, the first member coupled with the fluid discharge device, the second member coupled with the housing.

17. The fluid discharge assembly of claim 16, further comprising a plurality of ball bearings between the first member and the second member.

18. The fluid discharge assembly of claim 15, further comprising a drive shaft coupled with the rotational coupling to facilitate rotation of the oscillating monitor relative to the housing.

19. The fluid discharge assembly of claim 15, wherein the oscillating monitor is fixedly coupled with the fluid discharge device to cause rotation of the fluid discharge device responsive to rotation of the oscillating monitor.

* * * * *